United States Patent [19]
Matsuda et al.

[11] 4,251,144
[45] Feb. 17, 1981

[54] RANGEFINDING SYSTEM

[75] Inventors: Motonobu Matsuda, Kawachinagano; Tohru Matsui, Osaka; Yasuhiro Nanba, Osaka; Yoshihiro Tanaka, Osaka, all of Japan

[73] Assignee: Minolta Camera Kabushiki Kaisha, Osaka, Japan

[21] Appl. No.: 18,053

[22] Filed: Mar. 6, 1979

[30] Foreign Application Priority Data

Mar. 8, 1978 [JP] Japan .................................. 53-27013
Mar. 28, 1978 [JP] Japan .................................. 53-36299

[51] Int. Cl.³ .......................... G03B 7/08; G01J 1/20
[52] U.S. Cl. ........................................ 354/25; 250/201
[58] Field of Search .................. 354/25, 163; 352/140; 250/201, 204; 356/1, 4

[56] References Cited
U.S. PATENT DOCUMENTS

| | | | |
|---|---|---|---|
| 3,442,193 | 5/1969 | Pagel | 354/53 X |
| 3,443,502 | 5/1969 | Harvey | 354/25 |
| 3,723,003 | 3/1973 | Vockenhuber et al. | 354/163 X |
| 3,819,273 | 6/1974 | Unema et al. | 356/125 |
| 3,945,023 | 3/1976 | Stauffer | 356/4 |
| 4,004,852 | 1/1977 | Pentecost | 354/25 |
| 4,182,555 | 1/1980 | Imura et al. | 354/25 |

*Primary Examiner*—George H. Miller, Jr.
*Assistant Examiner*—Thomas H. Tarcza
*Attorney, Agent, or Firm*—Wenderoth, Lind & Ponack

[57] ABSTRACT

This invention is directed to a rangefinding system which includes a light beam source, a plurality of light receiving elements disposed to receive an image light spot reflected from a target object existing in any one of a group of distance zones in such manner that the image light spot is projected on one or more of the light receiving elements, the light receiving elements being adapted to produce a combination of outputs, the contents of which vary depending on the distance between the target object and the rangefinding system the invention also includes a logic circuit for producing signals indicating the distance zone in which the target object exists, the signal generated in response to the combination of outputs, so that the space occupied by the light receiving elements can be advantageously decreased and the precision of rangefinding can be improved.

11 Claims, 9 Drawing Figures

RANGEFINDING SYSTEM

BACKGROUND OF THE INVENTION

The present invention relates to a rangefinder in which trigonometric rangefinding is utilized.

Such a rangefinder comprises a light source S for projecting a light beam on a target object existing in any one of distance zones $\alpha$, $\beta$, $\gamma$ or $\delta$ as shown in FIG. 1. A plurality of light receiving elements $R_A$, $R_B$, $R_C$ and $R_D$, (such as photo sensitive diodes), are provided, each of which is assigned to the normal distance zones A, B, C and D and are placed at positions apart from said light source S. The respective distances therebetween are defined by the principle of trigonometric rangefinding to enable the light receiving elements to receive an image light spot reflected from the target object Q and to thereby enable said light receiving elements to produce signals indicative of the distance between the target object and the rangefinder.

Such a rangefinder is disclosed in U.S. Pat. No. 3,723,003.

In the conventional rangefinders of this type, the light receiving elements and processing circuit for processing the signal fed therefrom are arranged in such manner that an image light spot reflected from the target object is projected on only one of the light receiving elements at a time to produce signals indicative of one of the distance zones $\alpha$ through $\delta$.

However, in practice, the image light spot is apt to be formed over two or three light receiving elements by the effect of the spreading of the projected light beam caused by lens aberration and the spreading of image light spot caused by the image forming lens disposed in front of the light receiving elements. These defects are particularly noticeable when the target object exists on or near the border line between the two adjacent normal distance zones.

When the defects described above occur, the conventional rangefinder can not detect the distance zones accurately. In order to obviate such troubles, it has been suggested that either the length of respective distance zones assigned to corresponding light receiving elements be enlarged or the base length between the light source and the light receiving elements be extended. In the former case, however, the rangefinding precision becomes poor and in the latter case, the rangefinding device becomes large in size and occupies a large space.

To the contrary, it is required that a rangefinder should be made not only as small as possible but also be made to precisely detect the distance zones when it is installed in a camera.

In order not only to minimize the size of the rangefinder but to precisely detect distance zones, the use of an extremely fine light beam and highly precise optical system has been proposed; however, such a light source and optical system are expensive.

SUMMARY OF THE INVENTION

An essential object of the present invention is to provide a rangefinder capable of precisely detecting distance zones and of a sufficiently small size to be suitable for use in a camera.

Another object of the present invention is to provide a rangefinder capable of accurately detecting distance zones and producing signals indicating that the target object exists in one of said distance zones under the condition that an image light spot reflected from a target object is projected onto two or more light receiving elements as well as on only one light receiving element.

A further object of the present invention is to provide a rangefinder capable of detecting distance zones divided into more than the number of light receiving elements provided therein, so that distance between the target object and rangefinder can be more precisely detected by a small number of light receiving elements.

A still further object of the present invention is to provide a device for automatically adjusting the focus setting of an objective lens provided with the improved rangefinder of the present invention.

BRIEF DESCRIPTION OF THE DRAWINGS

Other objects and features of the present invention will be apparent from the description made below in conjunction with preferred embodiments of the present invention with rerefrence to the attached drawings in which.

DESCRIPTION OF THE PREFERRED EMBODIMENTS

Figure 3:
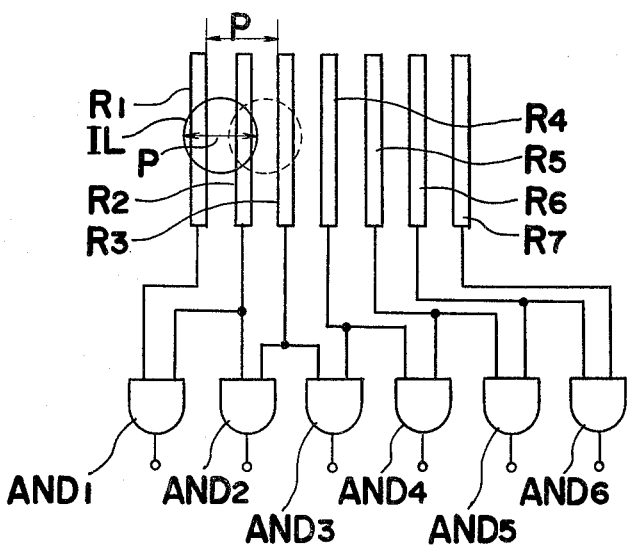
FIG. 3 shows a schematic diagram of an essential portion of one embodiment of a rangefinder according to the present invention.

FIG. 3 shows an embodiment of the present invention, wherein a plurality of photo sensitive elements R1, R2, . . . R7, (such as photo sensitive diodes), are arranged in a row to receive an image light spot IL having a diameter P and reflected from a target object on two adjacent photo sensitive elements simultaneously; the photo sensitive elements R1 through R7, are also arranged with such spacing that an image light spot IL is not projected on more than two photo sensitive elements.

A logic circuit arrangement comprising a plurality of AND gates AND1, AND2, . . . AND6 is provided at the outputs of the photo sensitive elements R1 through R7 to produce signals identifying a distance zone where a target object exists.

For example, when a target object exists in the distance zone A (FIG. 1), an image light spot IL is formed on the photo sensitive elements R1 and R2 simultaneously; therefore, the AND gate AND1 produce a signal identifying the distance zone A.

When a target object exists in the distance zone E defined between the zones A and B, the image light IL is formed on the photo sensitive elements $R_2$ and $R_3$ simultaneously; therefore, the AND gate AND2 produces a signal identifying the distance zone E.

From the foregoing explanation, it is understood that the output signals of the AND gates AND3 through AND6 show the distance zones B, F, C, and G respectively.

Figure 4:
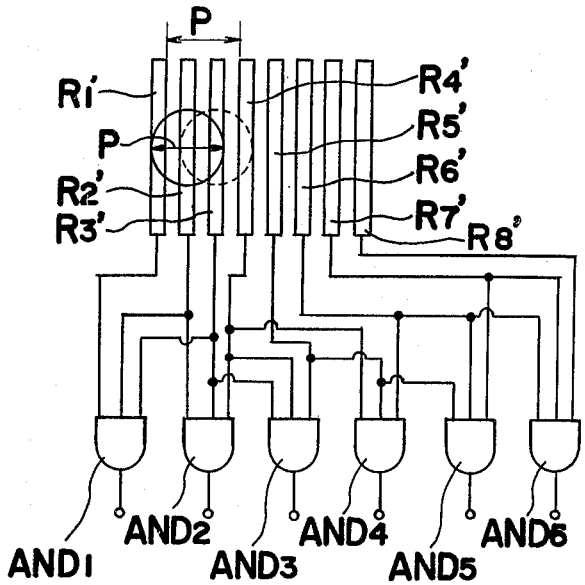
FIG. 4 shows a schematic diagram of an essential portion of another embodiment of a rangefinder according to the present invention.

FIG. 4 shows another embodiment of the present invention wherein a plurality of photo sensitive elements R1', R2'... R8', (such as photo sensitive diodes), are arranged in a row so as to receive an image light spot IL having diameter P reflected from a target object on three adjacent photo sensitive elements simultaneously. The photo sensitive elements R1' through R8' are arranged with such spacing that an image light spot IL is not projected on more than three photo sensitive elements.

A logic circuit arrangement comprising a plurality of AND gates AND1, AND2, ... AND6 is provided at the output of the photo sensitive elements R1' through R8' to produce signals identifying a distance zone where a target object exists.

For example, when a target object exists in the distance zone A (FIG. 1), an image light spot IL is formed on the photo sensitive elements R1', R2' and R3' simultaneously; therefore, the AND gate AND1 produces a signal identifying the distance zone A.

When a target object exists in the distance zone E defined between the distance zones A and B, the image light spot IL is formed on the photo sensitive elements R2', R3' and R4' simultaneously; therefore, the AND gate AND2 produce a signal identifying the distance zone E.

From the foregoing explanation, it is understood that the output signals of the AND gates AND3 through AND6 show the distance zone B, F, C, and G respectively.

Figure 2:
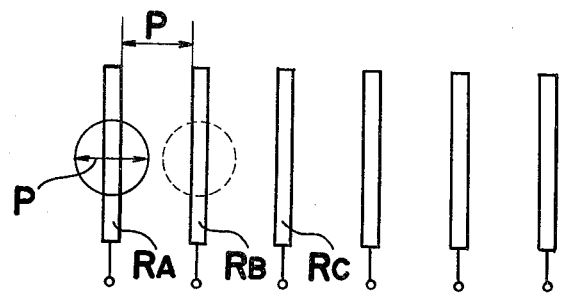
FIG. 2 is a schematic diagram showing the interrelationship between the image light spots and the light receiving elements of a conventional rangefinder.

As understood from the embodiments described above, the light receiving elements can be arranged at a closer interval relative to the diameter of light beam as compared to that of the conventional device as shown in FIG. 2, so that space occupied by the light receiving elements can be decreased.

Figure 5:
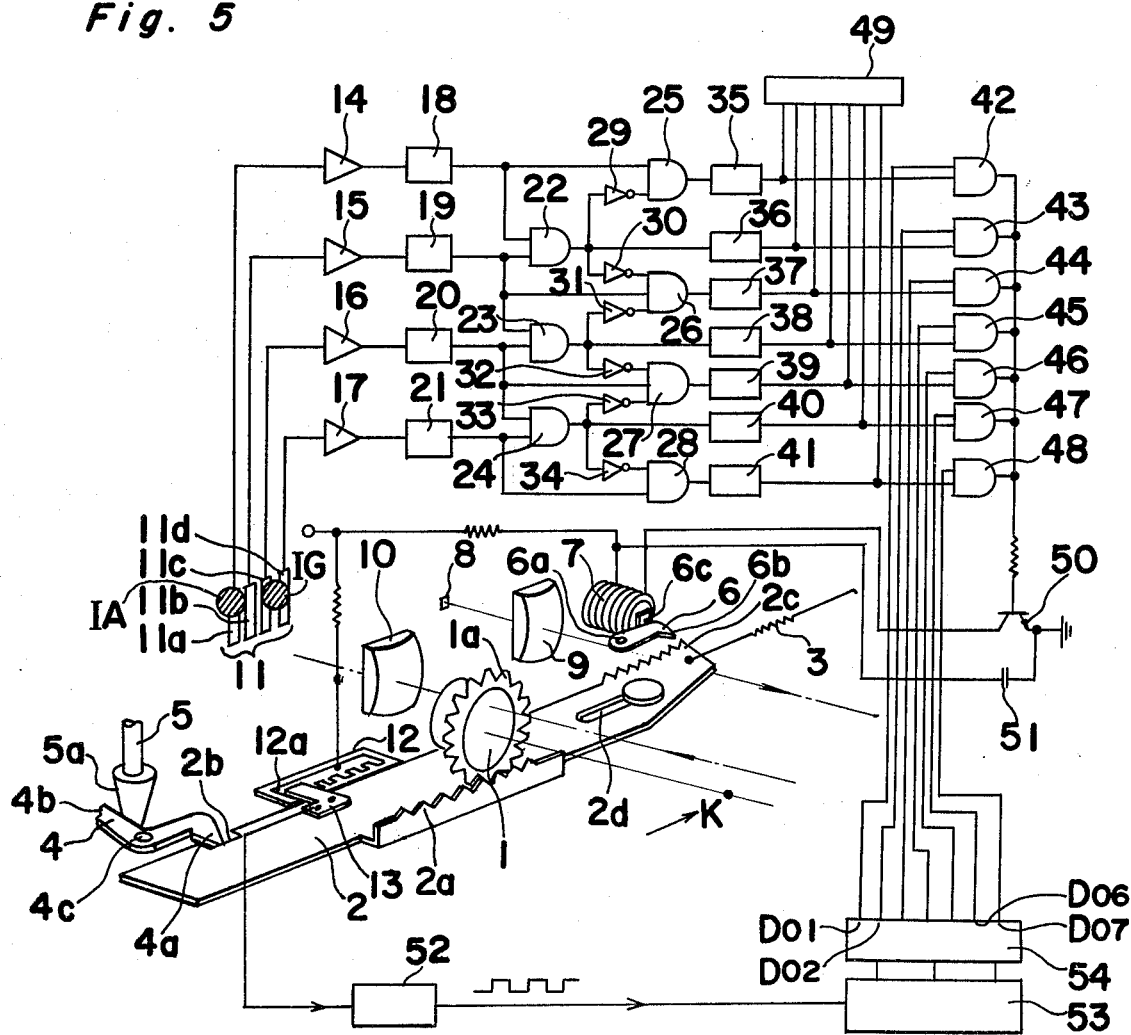
FIG. 5 is a circuit diagram showing another embodiment of a rangefinder according to the present invention.

Referring to FIG. 5, there is schematically shown an objective lens 1 embodied in a camera having a pinion 1a around the periphery thereof. The pinion 1a is engaged with a rack gear 2a provided along one longitudinal side edge of a charging plate 2 for rotation of the pinion 1a by the sliding motion of said charging plate 2. When the pinion 1a rotates, the objective lens 1 is moved in the direction of the lens axis by means of a known adjusting mechanism so as to focus the objective lens 1 on a target object (not shown).

The charging plate 2 is stopped in a charging position against the force of a spring 3 biasing the charging plate 2 in a longitudinal direction, (as shown by an arrow mark K), by means of a stopping lever 4 pivoted on an axis 4c, one free end 4a of which is engaged in a notch 2b. A tapered member 5a of a release button 5 slidably contacts the other end 4b of the stopping lever 4 so as to rotate the stopping lever 4 counterclockwise by the downward motion of the release button 5, causing the end 4a of the stopping lever 4 to be disengaged from the notch 2b to cause the charging plate 2 to slide in the direction of the arrow mark K along the elongated opening 2d.

A ratchet member 6 is pivotally mounted on an axis 6a so as to engage the end 6b thereof with teeth 2c provided along the edge of the end portion of the charging plate 2 to arrest the latter 2 at the controlled position where the objective lens 1 is focused on the target object.

An electromagnet 7 having a permanent magnet core is provided to attract the piece 6c of the rachet member 6.

A light source 8 is provided for emitting a pulse of light to the target object for rangefinding. During the operation of rangefinding, it emits a light for a short duration of time. It is desirable for this light source 8 to emit as fine a light beam as possible, while on the other hand, it is desirable for the light source 8 to have a large output. In order to satisfy these requirements, it is desirable to use an infrared luminance diode. The light beam emitted from the light source 8 passes through a projection lens 9 provided on the rangefinding part of the camera at a position opposite to the target object, so that the light beam is condensed and projected onto the target object.

An image-forming lens 10 is disposed at a suitable distance of the base length from the projection lens 9, and forms an image light spot reflected by the target object.

Figure 1:
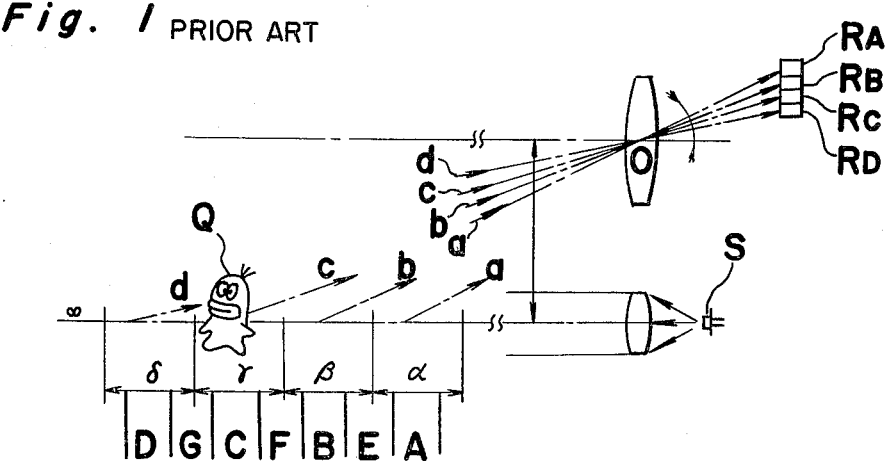
FIG. 1 is a schematic diagram showing principle of trigonometric rangefinding.

Transducers 11 comprise a plurality of photo sensitive diodes arranged in a row in back of the image-forming lens 10. On the light receiving surface thereof the image light spot reflected from the target object is projected. In the present embodiment, four photo sensitive diodes 11a, 11b, 11c and 11d are shown. Since the position of the image light spot projected on the photo sensitive diodes varies according to the distance between the transducers 11 and the target object, (in accordance with the principle of trigonometric rangefinding), the distance between the target object and the camera can be detected by identifying the photo sensitive diodes on which the image light spot is projected. According to the present embodiment, the photo sensitive diode 11a is disposed at the position corresponding to the distance zones A and E (as shown in FIG. 1), 11b to E,B and F: 11c to F,C and G, and 11d to G and D respectively. The zone A denote a distance range of 0.9–1.05 m; E: 1.05–1.25 m; B: 1.25–1.5 m; F: 1.5–1.8 m; C: 1.8–2.3 m; G: 2.3–3.2 m; and zone D: 3.2–5.5 m.

It is noted that each of the distance zones A, B, C, and D are referred to as normal distance zones; on the other hand E, F, and G are referred to as intermediate distance zones.

It is further noted that the normal distance zones A, B, C, and D correspond to such zones that the image light spot reflected from the target object is projected on any one of the photo sensitive diodes 11a, 11b, 11c and 11d at a time, on the other hand the intermediate zones E, F, G correspond to such zones that the image light spot is projected across two of the adjacent photo sensitive diodes.

An electrode plate 12 is fixedly disposed parallel with the charging plate 2. On the upper surface of the electrode 12, there are formed distance patterns 12a of a printed conductor which form comb-tooth shaped electrodes, each of the teeth of which corresponds to one of the distance zones A through G. A slider 13 is secured to the charging plate 2 so as to contact each of the teeth 12a in turn. Thus, when the charging plate 2 moves in the direction K, the slider 13 produces pulses which represent the position of the objective lens 1 as it is focused on any one of the distance zones A through G.

A.C. amplifiers 14, 15, 16 and 17 are connected respectively with the output terminals of the photo sensitive diodes 11a, 11b, 11c, and 11d. Respective shaping circuits 18, 19, 20 and 21 are connected to the output terminals of the A.C. amplifiers 14, 15, 16, and 17. AND gates 22, 23 and 24 have one of their respective input terminals connected to the output terminals of the shaping circuits 18, 19, and 20, and the other of their respective input terminals connected to the output terminals of the shaping circuits 19, 20, and 21. The elements 29–34 are respectively NOT circuits, which are connected in pairs with the output terminals of the AND gates 22, 23, and 24.

The elements 25, 26, 27, and 28 are AND gates, of which 25 and 28 have two inputs and 26 and 27 three inputs, to which the outputs of the corresponding amplifiers 18, 19, 20, and 21 are directly applied, and the outputs of the AND gates 22, 23, and 24 are applied via the NOT circuits 29–34.

Memory circuits 35–41 are connected respectively to the output terminals of the AND gates 22–28, and temporarily independently store the outputs of the respective AND gates thereof. A display circuit 49 constituted, for example by a plurality of luminous diodes, is connected to the output terminals of the memory circuits 35–41. According to the output of the memory circuits 35–41, a single luminous diode is lighted to indicate the distance of the targeted object.

The elements 42–48 are AND gates, having one of their respective input terminals connected to the output terminals of the memory circuits 35–41 and their other respective input terminals connected to the output terminals of a decoder circuit 54 to be described hereinafter. A transistor 50 has its collector connected to an end of the excitation coil of the electromagnet 7 and its emitter grounded; the transistor 50 acts as a switching element to turn on and off the electromagnet 7 in response to the output signal of the AND gates 42–48. A capacitor 51 is connected between the other terminal of the coil of the electromagnet 7 and ground. At the instance the transistor 50 is turned on, the capacitor 51 discharges, through the coil of the electromagnet 7, the electric charge which has been stored during the off condition of the transistor 50 and excites the electromagnet 7. A monostable multivibrator 52 is provided to detect the pulses derived from the slider 13 each time the slider 13 contacts any one of the teeth 12a. Designation 53 denotes a counter circuit which counts the number of the pulses supplied from monostable multivibrator 52 and applies them to the decoder 54. The decoder 54 operates to set one of its output terminals to a high level according to the contents of the counter 53.

In order to shoot the target object, the photographer adjusts the position of a camera in a manner to set the target object within the framing zone in the finder (not illustrated). Then, when the release button 5 is pushed down, the light source 8 emits a light beam for a short duration. This light beam is condensed by the projection lens 9 and projected toward the target object. The image of the light source 8 projected to the target object and reflected thereby is focused by the image forming lens 10.

Now, assuming that the target object is positioned within the distance zone A, the image light spot $I_A$ reflected from the target object is formed on the photo sensitive diode 11a through the image-forming lens 10. Thus, a pulse signal is obtained from the photo sensitive diode 11a only. This signal is amplified by the A.C. amplifier 14, and then supplied via the shaping circuit 18 to the respective input terminals of the AND gates 22 and 25. Since the other input terminal of the AND gate 22 is connected with the output terminal of the shaping circuit 19, the input to the AND gate 22 becomes a low level, and the output of said AND gate 22 shows a low level.

The output of the AND gate 22 is applied to the NOT circuits 29, 30, by which the outputs of said NOT circuits 29, 30 become a high level. Consequently, pulse signals of a high level are generated at the output of the AND gate 25. No output is produced at the AND gate 26, because the output of the shaping circuit 19 is at a low level. For the same reason, no output appears at the respective AND gates 27 and 28.

The high level signal of the AND gate 25 is stored in the memory circuit 35 and further applied to the display device 49 to indicate that the target object is in the normal distance zone A.

On the other hand, when the release button 5 is pressed down under the above condition, the stopping lever 4 is turned counterclockwise along the tapering surface of the tapered member 5a, by which the one end 4a of the stopping lever 4 is disengaged from the notch 2b, causing the charging plate 2 to move in the direction K by the biasing force of the spring 3. By the movement of the charging plate 2, the pinion 1a is rotated, thereby causing the objective lens 1 to move from one distance limit position, e.g., in the present embodiment, in the direction away from the nearest distance position. While the objective lens 1 moves to the position corresponding to the distance zone A, the slider 13 slides over the electrode plate 12 to produce a pulse, which is fed to the monostable multivibrator 52. The output of the monostable multivibrator 52 is fed to the counter 53 to render the terminal $D_{01}$ of the decoder 54 to be at a high level. At this time, the inputs fed to the two input terminals of the AND gate 42 both become a high level, and its output also becomes a high level. This high level signal is applied to the base of the transistor 50 to turn on it. Thus, the electric charge of the capacitor 51 is discharged through the coil of the electromagnet 7, the ratchet member 6 is released from the electromagnet 7 to be engaged with the teeth 2c, and arrest the charging plate 2. By this action, the objective lens 1 is set to the position corresponding to the normal distance zone A. Thereafter, by releasing the shutter of a camera in a known suitable method, all the actions for taking photograph on the part of the camera are over.

When the target object is positioned at the intermediate distance zone G between the normal distance zones C and D, the image light spot reflected from the target object is projected over the two photo sensitive diodes 11c and 11d as shown in $I_G$.

In such case, outputs are obtained from both of the photo sensitive diodes 11c and 11d. These signals are fed through the amplifiers 16, 17 and the shaping circuits 20, 21 and fed to the AND gates 23, 24 and 27, 28, upon which the two input terminals of the AND gate 24 both becomes a high level and the output of this AND gate becomes a high level. The output signal is applied to the memory circuit 40 and in turn to the display device 49, by which the presence of a target object in the distance zone G is indicated.

Also, by the output of the memory circuit 40, one of the input terminals of the AND gate 47 becomes a high level. The outputs of other memory circuits 35-39 and 41 are at a low level. By the movement of the charging plate 2, pulses are sequentially produced from the slider 13 each time the slider contacts and passes through one of the teeth. The value stored in the counter 53 also varies in response to the application of the pulses fed from the monomultivibrator 52. The respective terminals of the AND gates 42-46 and 48 are kept at a low level by the outputs of the memory circuits 35 to 39, and the transistor 50 remains in its cut off state. When the objective lens 1 reaches the position corresponding to the distance zone G, the output $D_{06}$ of the decoder 54 becomes a high level, and the high level signal is applied to the AND gate 47 and in turn the transistor 50 is turned on, whereby the electromagnet 7 is excited to arrest the charge plate 2 in a manner similar to the operation described above, and sets the lens 1 to the position corresponding to the distance zone G.

Similar operations take place when the target object is located in other zones. When either one of the photo sensitive diodes 11b, 11c, and 11d receives the image light spot, the signal is stored in one of the corresponding memory circuits 37, 39, and 41, by which the presence of the target object in one of the normal distance zones B, C, and D is detected. When the two photo sensitive diodes 11a and 11b receive the image light spot simultaneously, the output of the AND gate 22 is stored in the memory circuit 36, by which detection is made that the target object is located in the intermediate distance zone E. When the photo sensitive diodes 11b and 11c receive the image light spot, the output of the AND gate 23 is stored in the memory circuit 38, by which detection is made that the object is in the intermediate distance zone F. On the other hand, the slider 13 produce pulses while the slider 13 moves, the pulses are fed to the monostable multivibrator 52. These pulses are counted by the counter 53, which generates an output at one of the output terminals $D_{01}-D_{07}$ of the decoder 54. The output of the decoder 54 is fed to one of the AND gates 42-48. By this operation, when one of the AND gates produces a high level output, the transistor 50 is brought into its "on" state, thereby causing the electromagnet 7 to be excited to arrest the charging plate 2 in a position where the objective lens 1 is focused on the distance zone in which the target object exists.

By these selective actions it is possible to relate the information with respect to the position of the objective lens 1 with the signal representing the distance zone produced by processing the signals obtained from each of photo sensitive diodes 11a-11d.

Another embodiment of the present invention will be explained with reference to FIGS. 6 and 7 wherein the image light spot reflected from the target object is adapted to be projected over two or three photo sensitive diodes which are disposed with small interval of space relative to the diameter of the image light spot. Such a condition may take place when the base length between the projection lens 9 and the image-forming lens 10 is short, as when the range finding device is installed in a small space in a camera or the like.

Figure 6:
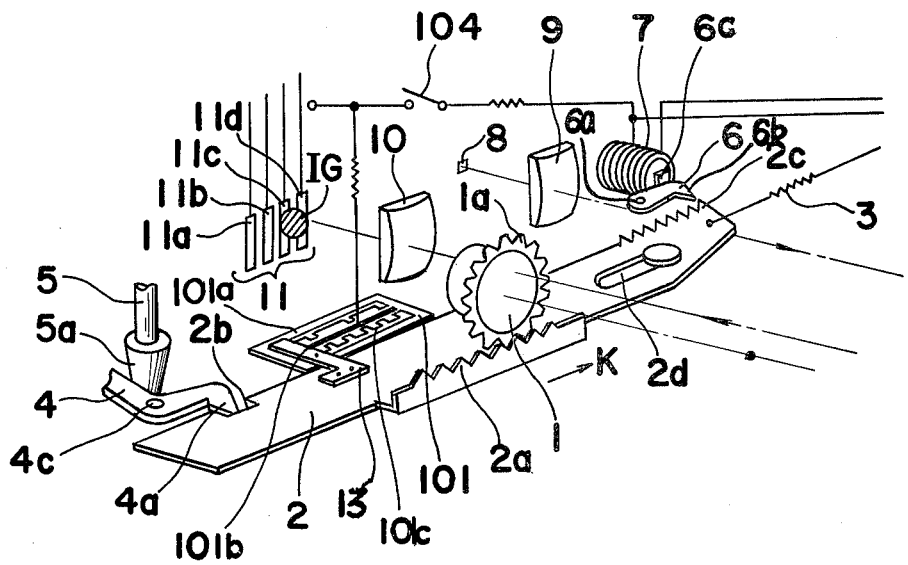
FIG. 6 is a perspective view showing an embodiment of a lens adjusting mechanism operating in association with a rangefinder according to the present invention.
Figure 7:
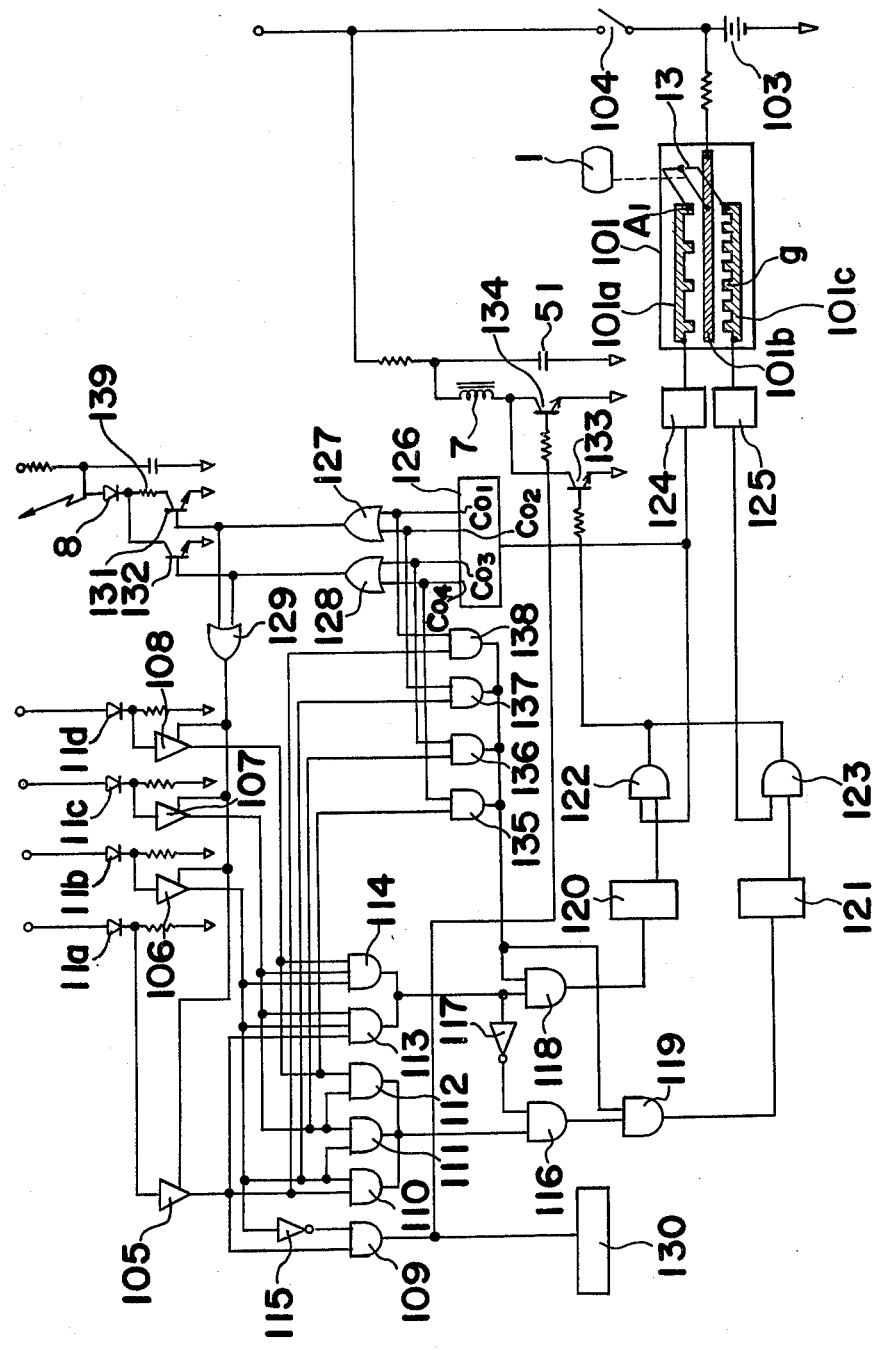
FIG. 7 is a circuit diagram showing a further embodiment of a rangefinder according to the present invention.

In FIGS. 6 and 7, the light source 8 and the photo sensitive diodes 11a-11d, having the same arrangements as those of FIG. 5, are represented by the same reference numerals.

The element 101 is an electrode plate on the surface of which there are printed the distance pattern 101a which has the comb-tooth shaped electrodes at the positions corresponding to the normal zones A, B, C, and D, the distance pattern 101c which has the comb-tooth shaped electrodes at the positions corresponding respectively to the normal distance zones A, B, C, and D and the intermediate distance zones E, F, and G, and the common pattern 101b. The slider 13 is adapted to slide along the distance patterns 101a, 101b, and 101c, simultaneously with the movement of the charging plate 2. The element 103 is a power source, and element 104 is a power switch. The elements 105-108 are the A.C. amplifiers which amplify the pulse signals obtained from the photo sensitive diodes 11a-11d. The elements 109-114, 116, 118, 119, 122, and 123 are AND gates, and elements 115 and 117 are NOT circuits, which as a whole constitute a logic circuit, arranged in such a manner that, when any two adjacent photo sensitive diodes 11a, 11b, 11c, and 11d receive the image light spot at the same time, the AND gate 119 generates a pulse, and when any three adjacent photo sensitive diodes receive the image light spot simultaneously, the AND gate 118 generates a pulse. For example, when pulse signals are derived from the photo sensitive diodes 11a and 11b simultaneously, the pulse signals are amplified by the A.C. amplifiers 105 and 106, after which the signals are fed through the AND gate 110 to one input terminal of the AND gate 116. On the other hand, since the outputs of the AND gates 113 and 114 are both at a low level, the output of NOT circuit 117 becomes a high level, and the output of the AND gate 116 becomes a high level.

When pulse signals are derived from three photo sensitive diodes 11a, 11b, and 11c, pulse signals appear at the output terminal of the AND gate 118 after being transmitted through the AND gate 113. When the output of the AND gate 113 becomes a high level, the output of the NOT circuit 117 becomes a low level, so that the output of the AND gate 116 remains at a low level.

The elements 120 and 121 are the LATCH circuits for temporarily storing the pulse signal obtained from the AND gates 118 or 119. The output terminals of the LATCH circuits 120 and 121 are connected to the respective input terminals of AND gates 122 and 123.

The distance patterns 101a and 101c are connected to the respective input terminals of the AND gates 122 and 123 through monostable multivibrators 124 and 125, each of which generates a pulse of predetermined duration upon receipt of a pulse fed from the distance patterns 101a or 101c. A counter 126 is provided at the output terminal of the monostable multivibrator 124 to count the number of the pulses fed from the electrodes 101a and thereby rendering one of the output terminals $C_{01}$ through $C_{04}$ to be at a high level corresponding to the contents of the counter 126. Respective output terminals $C_{01}$ through $C_{04}$ of the counter 126 are connected to OR gates 127 and 128 whose output terminals are connected to the bases of transistors 131 and 132 respectively. Also the output terminals of the counter 126 are connected to the respective input terminals of AND gates 135 through 138 respectively.

The light source 8 is connected with the collector of the transistor 131 through a resistor 139 and the collector of the transistor 132 directly. By this arrangement, when the transistor 131 turns on, (while the range finding device scans a near distance zone), the light source 8 emits a weak light caused by the lowered current flowing through transistor 131, thus economizing electric power consumption. On the other hand, when transistor 132 turns on, (while the range finding device scans a further distance zone), the light source 8 emits a strong light caused by the current flowing the through transistor 132.

The output terminals of both OR gates 127 and 128 are also connected to the input terminals of an OR gate 129 whose output terminals is connected to the input terminals of A.C. amplifiers 105 through 108 for actuating them in response to the output signal of the counter 126.

The electromagnet 7 is connected to the collectors of transistors 133 and 134. The base of said transistor 133 is connected to the output terminals of the respective AND gates 122 and 123 and the base of the transistor 134 is connected to the output terminal of the AND gate 109. Thus, the electromagnet 7 is excited when one of the transistors 133 or 134 turns on to arrest the displacement of the charging plate 2 in a particular position.

In operation, the power switch 104 is initially closed and the release button 5 is pushed to disengage the stopping lever 4 from the notch 2b. By this operation, the charging plate 2 is moved by which objective lens 1 starts to move from the short distance scale towards the infinity scale. When the lens 1 is adjusted to a position to be focused at the distance zone A (see FIG. 1), the slider 13 contacts the first electrode $A_1$ of the distance pattern 101a, a pulse is fed to the counter 126 therefrom through the monostable multivibrator 124, and the counter 126 produces a pulse at the output terminal $C_{01}$. When the lens 1 is adjusted to a position so as to be focused at the distance zone B, a pulse is produced from the terminal $C_{02}$. The relative positions hereafter are such as to obtain pulse outputs from the terminal $C_{03}$ for zone C and from the terminal $C_{04}$ for zone D.

Now, assuming that a target object exists in the normal distance zone A, when the lens 1 is moved to the focal position corresponding to the distance zone A, the terminal $C_{01}$ of the counter 126 becomes a high level in response to the application of the pulse from the distance pattern 101a and the high level signal is fed to the base of the transistor 131, thereby causing it to turn on. Thus the light source 8 is illuminated with the current lowered by the resistor 139 to economize the power when the light source 8 projects light within a short range distance. Assuming that the light beam is projected to the target object existing in the normal distance zone B and reflected therefrom, a image light spot of the reflected light is projected on each of the photo sensitive diodes 11a, 11b and 11c. The output signal from the photo sensitive diode 11a is applied to the AND gates 109, 110, 113, and 138. Also, the signal from the photo sensitive diode 11b is applied to the AND gates 110, 113 and 114. Further, the signal from the photo sensitive diode 11c is applied to the AND gates 111, 113 and 114.

By the above operation, the AND gates 110, 111 and 113 generate high level signals, which are applied to the AND gates 116 and 118. On the other hand, as the AND gate 138 is held by the high level signal fed from the terminal $C_{01}$ of the counter 126, the output of the AND gate 138 becomes a high level, which is applied to the AND gate 118, by which the output of the AND gate 118 becomes a high level. This high level signal is applied to the LATCH circuit 120. Since one of the input terminals of the AND gate 116 is held at a low level by the output of the inverter 117, the output of the AND gate 116 is also held at a low level.

Application of a signal to the LATCH circuit 120 provides a signal indicating the fact that the target object exists in the normal distance zone B. Thereafter, when the objective lens 1 further advances to reach the position corresponding to the distance zone B, the second pulse is generated from the distance pattern 101a.

By this pulse the output of the AND gate 122 becomes a high level, and the transistor 133 is turned on to excite the electromagnet 7, by which the ratchet member 6 is engaged with the teeth 2c, thus the charging plate 2 and the objective lens 1 are arrested at the normal distance zone B in a manner similar to the action described in the example of FIG. 5.

Then it is assumed that the target object exists in the intermediate distance zone G. In this case, the two photo sensitive diodes 11c and 11d receive the image light spot reflected from the target object.

In this case, the signal from the photo sensitive diode 11c is applied to the AND gates 111, 112, 113, 114 and 136, and the signal from the photo sensitive diodes 11d to the AND gates 112, 114 and 135. As the output of the AND gate 112 becomes a high level and the outputs of the AND gates 113 and 114 are at a low level, the output of the inverter 117 becomes a high level and the output of the AND gate 116 becomes a high level. Said output of the AND gate 116 is applied to the AND gate 119.

On the other hand, the charging plate 2 moves and the slider 13 slides along the distance patterns 101b and 101c, by which firstly the terminal $C_{01}$ of the counter 126 becomes a high level, but, because the other inputs of the AND gates 137 and 138 are both at a low level, their outputs are also at a low level, so that both of the inputs of the AnD gates 118 and 119 become a low level, because of which the transistor 133 is not conductive and the charging plate 2 moves further. When the objective lens 1 reaches the position corresponding to the distance zone C and the terminal $C_{03}$ of the counter 126 becomes a high level, the output of the AND gate 136 becomes a high level, and accordingly the output of the AND gate 119 becomes a high level.

The output of this AND gate 119 is stored in the memory circuit 121. When the charging plate 2 further moves and the slider 13 reaches the electrode g of the distance pattern 101c, a pulse produced thereby causes the output of the AND gate 123 to become a high level, by which the transistor 133 is turned on to excite the electromagnet 7, which arrests the objective lens 1 at the position corresponding to the intermediate distance zone G.

In case the target object exists within a range nearer than the minimum focusing distance setting of the objective lens 1, only the photo sensitive diode 11a receives the image light spot reflected from the target object. The output of the photo sensitive diode 11a is applied to the AND gate 109 which receives a high level signal from the inverter NOT circuit 115. Thus, the AND gate 109 transmits an output signal to the indicator 130 which shows the fact that the target object exists within such a near distance zone.

Figure 8:
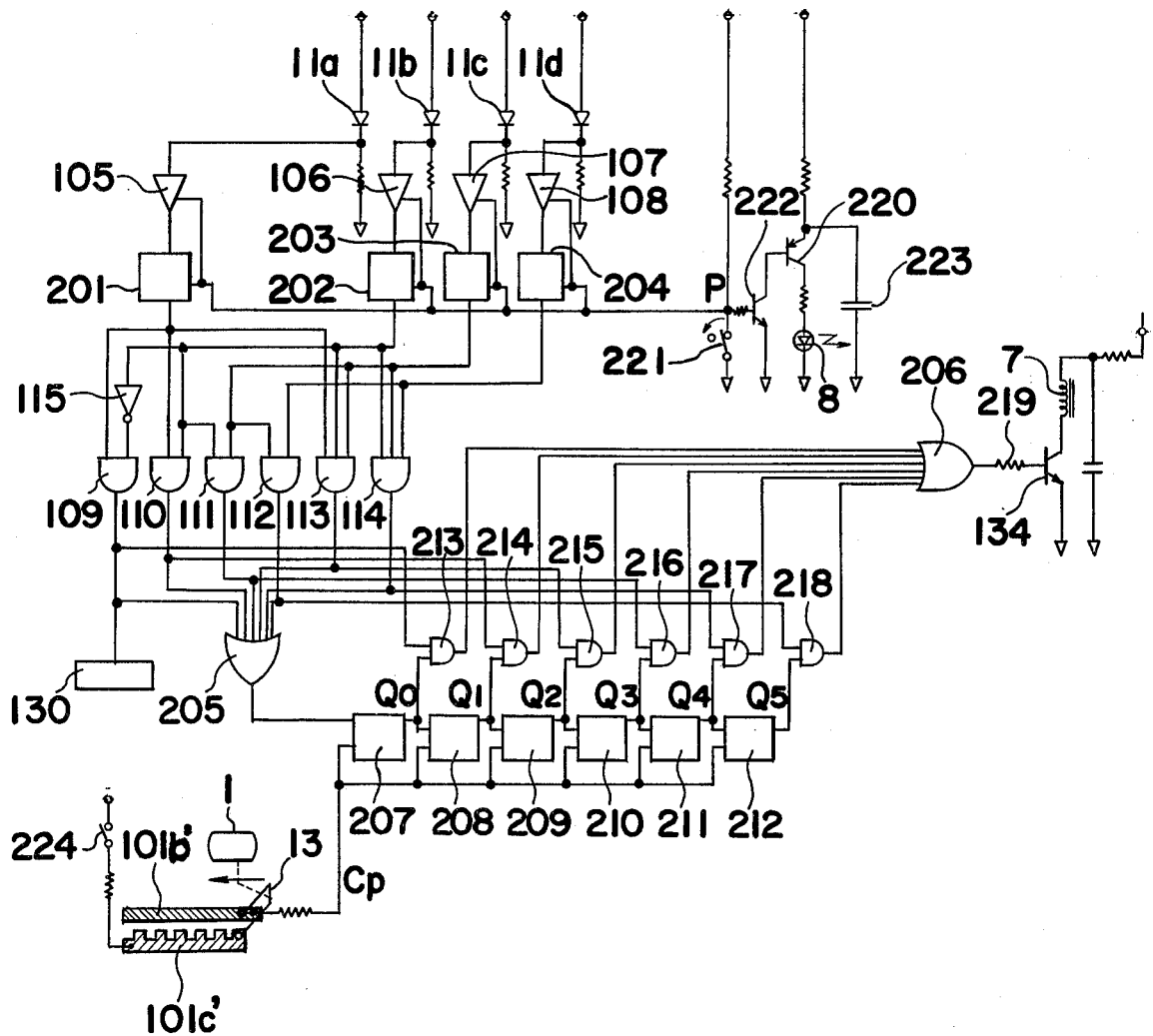
FIG. 8 is a circuit diagram showing a still further embodiment of a rangefinder according to the present invention.

Referring to FIG. 8 showing a further embodiment of the present invention, flip-flops 201–204 of the D type are respectively provided at the output of the A.C. amplifiers 105 through 108 so as to store each of the output pulses fed from the photo sensitive diodes 11a through 11d. The AND gates 109 through 114 are arranged in a manner similar to those shown in FIG. 7. The respective outputs of the AND gates 109 through 114 are connected to an OR gate 205 whose output is connected to flip-flop 207 of D type. Six flip-flops 208 through 212 are serially connected. AND gates 213 through 218 are provided to receive the outputs from the flip-flops 207 through 212 and the AND gates 109 through 114 respectively. The flip-flops 207 through 212 are adapted to receive a clock pulse CP fed from the distance pattern 101*b'* at their read-in input terminals so that the content of one flip-flop is transferred to the next stage each time the clock pulse Cp is applied to the flip-flops.

The outputs of the AND gates 213 through 218 are applied to the respective input terminals of an OR gate 206 whose output terminal is connected through a resistor 219 to the base of the transistor 134 which operates the electromagnet 7.

The light source 8 is disposed at the collector of a transistor 220 which is actuated by the collector output of the transistor 222. A switch 221 is connected to the base of the transistor 222 to turn the transistor 222 and 220 on when said swtich 221 is switched over into its off state.

When the transistor 222 conducts, the light source 8 emits a pulse of light against the target object, which is assumed to be in a distance zone F, for example. Under such a state the photo sensitive diodes 11*b* and 11*c* receive the image light spot reflected from the target object and the signals fed from the photo sensitive diodes 11*b* and 11*c* are applied to the input terminals of the flip-flops 202 and 203, which store said signals upon receipt of the readin pulse fed from the junction P.

The output of the flip-flop 202 is applied to the NOT circuit 115, the AND gates 110, 111, 113 and 114, and the output of the flip-flop 203 is applied to the AND gates 111, 112, 113 and 114, thereby rendering the output of the AND gate 111 to be a high level. The outputs of the AND gate 111 are applied to the flip-flop 207 through the OR gate 205 and to the AND gate 216. On the other hand, when the release button 5 is pushed down to disengage the stopping lever 4 from the notch 2*b*, the charging plate 2 slides, while the switch 224 is turned on. By this operation, pulses CP are produced from the electrode 101*b'* each time that the slider 13 contacts one of the teeth of the distance pattern 101*c'*. When the first pulse of CP is applied to the flip-flop 207, the output of the OR gate 205 is stored therein. Thus, the output terminal $Q_0$ of the flip-flop 207 becomes high level. Under such a condition, however, the output of the AND gate 213 remains at a low level because the output of the AND gate 109 is also at a low level. When the slider 13 reaches the second tooth of the distance pattern 101*c'*, at a position where the objective lens 1 is focused to the zone E, the second pulse CP is applied to the flip-flops 207 through 212, in turn the content of the flip-flop 207 is transferred to the flip-flop 208 resulting in the generation of a high level signal at the output $Q_1$ of the flip-flop 208. A similar operation is repeated until the objective lens 1 reaches a position where the focal distance thereof is set to the distance zone F. When the objective lens is set to said position corresponding to the distance zone F, the output $Q_3$ of the flip-flop 210 becomes a high level upon receipt of the fourth pulse CP at its read-in terminal, in turn this high level signal is applied to the AND gate 216 which receives the other high level signal from the AND gate 111, thereby causing the AND gate 216 to produce a high level signal which is sent to the base of the transistor 134 through the OR gate 206. Thus, the transistor 134 turns on to excite the electromagnet 7 and the objective lens 1 is arrested at the position where the lens 1 focuses on the target object existing in the distance zone F.

It is appreciated that according to this embodiment, the range finding operation can be perfected by only one illumination of the light source 8 since the outputs of the respective photo sensitive diodes are stored in the flip-flops 201 through 204.

In addition, when the target object is placed within a range nearer than the minimum focusing distance setting of the objective lens 1, the indicating circuit 130 indicates this fact in a similar operation as described in the foregoing embodiment. Under such a condition, if the release button 5 is operated erroneously, the output of the AND gate 109 is applied to the AND gate 213, thus the objective lens 1 is set to the minimum focusing distance because immediately after the switch 224 is turned on the output of the AND gate 213 becomes a high level so that the transistor 134 turns on and the electromagnet 7 is excited to arrest the charging plate 2.

Figure 9:
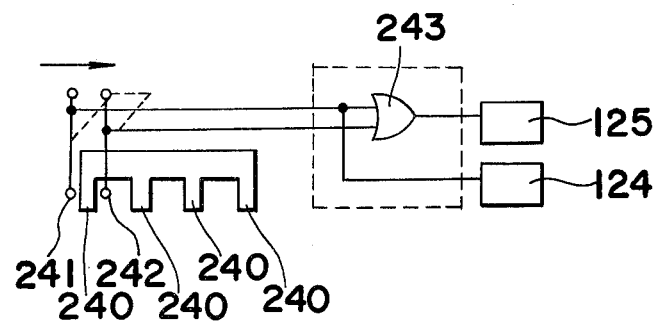
FIG. 9 is a plan view of an example of a modified electrode employed in the embodiments of the present invention.

FIG. 9 shows an example of a modification of the electrode plate 12, in which each of the teeth electrodes 240 is separated by a space equal to the space of two adjacent photo sensitive diodes disposed so as to correspond to the normal distance zones A, B, C and D. A pair of slider 241 and 242 having a space of one half of the pitch defined by two adjacent teeth electrodes 240 are adapted to move simultaneously with the charging plate 2 along the row of teeth, contacting one of the teeth electrodes. Outputs derived from the respective slider 241 and 242 are fed to an OR gate 243. The output pulses of the OR gate 243 represent intermediate distance zones while the output pulses of the slider 241 represent the normal distance zone.

According to the present invention, it can be understood that the light receiving elements are arranged at a closer interval of length compared to the conventional rangefinder with the light beam having the same diameter as used in the conventional rangefinder. Therefore, the rangefinding system according to the present invention can be made small in size and cheap in price. In addition, the distance range of the rangefinder can be divided into a larger number of distance zones, each of which is assigned a shorter distance relative to the number of the light receiving elements provided therein, whereby a high rangefinding precision can be obtained.

What is claimed is:
1. A device for automatically adjusting the focus setting of an objective lens, said device comprising:
 (a) a light beam emitter for emitting a light beam;
 (b) an exit means for projecting said light beam emitted from said light beam emitter toward a target object located within a distance range consisting of a plurality of distance zones;
 (c) an entrance means for receiving a light beam reflected from said target object, said entrance means disposed at a predetermined distance from said exit means such that said reflected light beam is adapted to pass through said entrance means at an angle with respect to the emitted light beam whose value is dependent upon the distance between said target object and said device, said reflecting light beam projecting an image light spot representative of said target object;
 (d) a plurality of light receiving elements for generating an output in response to light impinging thereon, said plurality of elements disposed behind said entrance means for receiving said image light spot, said plurality of elements spaced a predetermined distance from each other and arranged in a row, wherein said image light spot impinges on at least one of said light receiving elements, the location of the impinging of said image light spot varying in accordance with the distance zone within which said target object is located, whereby said light receiving elements generate a combination of outputs;

(e) a logic circuit for receiving said combination of outputs from said plurality of light receiving elements and for generating a signal representative of said distance zone within which said target object is located, said signal generated by said logic circuit in accordance with said combination of outputs from said plurality of light receiving elements;

(f) means for shifting said objective lens along the optical axis thereof for focus adjustment;

(g) an arresting means for arresting said objective lens shifting means;

(h) trigger means for actuating said objective lens shifting means; and (i) means for actuating said arresting means in response to said signal generated by said logic circuit when said objective lens is set to a position corresponding to said distance zone within which said target object exists, said actuating means including a detector for detecting the position of said objective lens and generating actuating signals when said objective lens is brought into focus at one of said distance zones by the actuation of said objective lens shifting means, and a control circuit for comparing said actuating signals with said signal generated by said logic circuit and for actuating said arresting means upon the generation of the one of said actuating signals representing that said objective lens has been brought into focus at said distance zone represented by said signal generated by said logic circuit, whereby said objective lens is focused at said distance zone wherein said target object is located.

2. A device as claimed in claim 1, wherein said logic circuit includes a plurality of output terminals, each of said output terminals respectively corresponding to one of said distance zones, and wherein said logic circuit generates said output signal from one of said plurality of output terminals in accordance with the combination of outputs from said plurality of light receiving elements, said output terminals arranged such that the generation of an output signal from one of said plurality of output terminals represents that said target object is located within a distance zone corresponding to the distance zone corresponding to that output terminal; and wherein said detector includes a plurality of output terminals, each of said output terminals respectively corresponding to one of said distance zones such that each of said actuating signals is selectively generated from its corresponding output terminal of said detector; and wherein said control circuit includes a plurality of gates, each of said gates respectively corresponding to one of said distance zones, each of said plurality of gates having first and second input terminals, each of said first input terminals connected to its respective corresponding output terminals of said logic circuit and each of said second terminals connected to its respective corresponding output terminals of said detector, each of said plurality of gates generating an output for actuating said arresting means when said gate receives said signal from its respective corresponding output terminal of said logic circuit and said actuating signal from its respective corresponding output terminal of said detector.

3. A device as claimed in claim 2, further comprising means for actuating said light beam emitter at a fixed time subsequent to the activation of said objective lens shifting means.

4. A device as claimed in claim 3, further comprising:
means for storing said outputs of said light receiving elements, wherein said light beam emitter actuating means is operatively connected to said light receiving elements through said storing means, wherein the actuation of said light beam emitter is interrupted in response to the generation of an output from at least one of said light receiving elements, and wherein said logic circuit is operatively connected to said light receiving elements through said storing means for receiving said combination of outputs stored in said storing means after the actuation of said light beam emitter is interrupted.

5. A device as claimed in claim 3, wherein said light beam emitter actuating means includes means for decreasing the light intensity of said emitted light beam when said objective lens is set to focus on a near distance zone in comparsion to the light intensity emitted by said light beam emitter when said objective lens is set to focus on a more distant of said distance zones.

6. A device as claimed in claim 2, further comprising means for producing a warning signal when said signal generated by said logic circuit represents that said target object is located within a distance zone closer than a predetermined distance from said device.

7. A device for automatically focusing an objective lens, said device comprising:
a light beam emitter for emitting a light beam;
an exit means for projecting said light beam emitted from said light beam emitter for a target object located within a distance range consisting of a plurality of distance zones;
an entrance means for receiving a light beam reflected from said target object;
a plurality of light receiving elements arranged in a row behind said entrance means;
said exit means and said entrance means and said plurality of light receiving elements arranged such that said reflected light beam is projected as an image light spot on at least one of said plurality of light receiving elements, the at least one light receiving element upon which said image light spot is projected thereon being dependent upon the location of said target object within one of said plurality of distance zones;
a logic circuit operatively connected to said plurality of light receiving elements for generating a signal representative of the distance zone within which said target object is located;
means for shifting said objective lens along the optical axis thereof for focus adjustment;
arresting means for arresting said objective lens shifting means;
trigger means for actuating said objective lens shifting means;

detecting means for detecting which of said plurality of distance zones the objective lens is focused upon; and means operatively connected to said logic circuit and said focus detecting means for comparing the signals generated therefrom and for actuating said arresting means when said compared signals coincide, whereby said objective lens is focused at said distance zone wherein said target object is located.

8. A device as claimed in claim 7, wherein said focus detecting means comprises a plurality of electrically conductive teeth arranged in a row and mechanically connected to said objective lens, and further comprising at least one fixed electrical brush electrically connected to said plurality of teeth and further comprising additional circuit means operatively connected to said at least one electric brush for generating a signal corresponding to the distance zone upon which said objective lens is focused.

9. A device as claimed in claim 7, wherein said plurality of light receiving elements comprise four light receiving elements and wherein said image light spot is arranged to project on either one or two of said plurality of light receiving elements;

and wherein said target object is located within a distance range consisting of seven distance zones;

and wherein said logic circuit comprises three two-input AND gates, the two inputs of each of said gate operatively connected to respective pairs of adjacent light receiving elements, whereby the output of each of said two-input AND gates is indicative of said image light spot projected on its respective pair of adjacent light receiving elements;

and wherein said logic circuit comprises four multiple-input AND gates operatively connected to said outputs of said light receiving elements and the output of said two-input gates, wherein said multiple-input AND gates are arranged such that the output of each of said multiple-input gates represents that said image light spot is projected upon only one respective light receiving element;

and wherein said detecting means comprises a pulse generating means for providing pulses when said shifting means shifts said objective lens along its optical axis, said pulses representative of the distance zone in which said objective lens is focused, and wherein said detecting means further comprises a counter means operatively connected to said pulse generating means and a decoder means operatively connected to said counter means for providing seven outputs, each of said seven outputs of said decoder representative of one respective distance zone such that an output from one of said decoder outputs represents that said objective lens is focused in said corresponding respective distance zones;

and wherein said means for actuating said arresting means when said objective lens is focused in said distance zone wherein said target object is lcoated comprises seven additional two-input AND gates, one input of each of said additional two-input gates operatively connected to one respective output from the group of outputs comprising the output of said three two-input gates and said four multiple-input gates, and the second of each of said seven additional two-input gates operatively connected to one respective output of said seven decoder outputs, and wherein said seven additional two-input gates are operatively connected together to produce an output when said objective lens is focused in said distance zone wherein said target object is located.

10. A device as claimed in claim 7, wherein said plurality of light receiving elements comprise four adjacent light receiving elements;

and wherein said logic circuit comprises a plurality of gates for providing outputs representative of which of said two or three of four light receiving elements have said image light spot projected thereon, wherein said outputs of said plurality of gates are representative of the distance zone within which said target object is located.

11. A device as claimed in claim 10, wherein said plurality of light receiving elements comprises four light receiving elements arranged in a row;

and wherein said logic circuit comprises four memory elements, each memory element operatively connected to one respective light receiving element;

and wherein said image light spot is arranged to project on either two or three of four light receiving elements;

and wherein said logic circuit further comprises a plurality of gates operatively connected to said four memory elements for detecting which of said two or three light receiving elements have said image light spot projected thereon;

and wherein said detecting means comprises a pulse generating means and a shift register means, said pulse generating means and said shift register means operatively connected such that said shift register means provides an output representative of the distance zone that said objective lens is focused upon;

and wherein said means for actuating said arresting means when said objective lens is focused in said distance zone wherein said target object is located comprises a plurality of two-input AND gates, one input of each of said two-input gates and the second input of each two-input gate operatively connected to one respective output of said shift register, the output of said two-input gates operatively connected together to produce a signal for actuating said arresting means when one of said two-input gates detects coincidence between its two inputs, whereby such coincidence corresponds to said objective lens being focused in said distance zone wherein said target object is located.

* * * * *